(12) United States Patent
Dougherty et al.

(10) Patent No.: US 6,268,989 B1
(45) Date of Patent: Jul. 31, 2001

(54) RESIDENTIAL LOAD CENTER WITH ARCING FAULT PROTECTION

(75) Inventors: John J. Dougherty, Collegeville, PA (US); Donald McDonald, Avon, CT (US); Ronald D. Ciarcia, Bristol, CT (US); Edward E. Kim, Burlington, CT (US); Roger J. Morgan, Farmington, CT (US); James I. Smith, Avon, CT (US); Paul A. Raymont, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/210,307

(22) Filed: Dec. 11, 1998

(51) Int. Cl.$^7$ .................................................. H02H 3/00
(52) U.S. Cl. ............................. 361/63; 361/42; 361/93.1; 361/115
(58) Field of Search ........................... 361/42, 93.1, 115, 361/62, 63, 64, 66

(56) References Cited

U.S. PATENT DOCUMENTS

| | | | |
|---|---|---|---|
| 3,401,363 | 9/1968 | Vyskocil et al. | 335/17 |
| 3,443,258 | 5/1969 | Dunham et al. | 337/79 |
| 3,596,218 | 7/1971 | Layton | 335/17 |
| 3,596,219 | 7/1971 | Erickson | 335/17 |
| 4,208,690 | 6/1980 | McGinnis et al. | 361/48 |
| 4,345,288 | 8/1982 | Kampf et al. | 361/31 |
| 4,466,071 | 8/1984 | Russell, Jr. | 364/492 |
| 4,513,268 | 4/1985 | Seymour et al. | 335/35 |
| 4,513,342 | 4/1985 | Rocha | 361/94 |
| 4,552,018 | 11/1985 | Legatti et al. | 73/431 |
| 4,573,259 | 3/1986 | Seymour et al. | 29/602 R |
| 4,589,052 | 5/1986 | Dougherty | 361/94 |
| 4,598,183 | 7/1986 | Gardner et al. | 200/50 A |
| 4,641,216 | 2/1987 | Morris et al. | 361/45 |
| 4,641,217 | 2/1987 | Morris et al. | 361/45 |
| 4,658,322 | 4/1987 | Rivera | 361/37 |
| 4,667,263 | 5/1987 | Morris et al. | 361/42 |
| 4,672,501 | 6/1987 | Bilac et al. | 361/96 |
| 4,686,600 | 8/1987 | Morris et al. | 361/42 |
| 4,688,134 | 8/1987 | Freeman et al. | 361/45 |
| 4,702,002 | 10/1987 | Morris et al. | 29/837 |
| 4,847,850 | 7/1989 | Kafka et al. | 372/71 |
| 4,878,143 | 10/1989 | kalal et al. | 361/94 |
| 4,878,144 | 10/1989 | Nebon | 361/96 |
| 4,931,894 | 6/1990 | Legatti | 361/45 |
| 4,936,894 | 6/1990 | Larson et al. | 70/298 |
| 5,089,796 | 2/1992 | Glennon et al. | 335/172 |
| 5,121,282 | 6/1992 | White | 361/42 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,682 | 6/1993 | Pham et al. | 200/148 R |
| 5,224,006 | 6/1993 | MacKenzie et al. | 361/45 |
| 5,229,730 | 7/1993 | Legatti et al. | 335/18 |
| 5,245,302 | 9/1993 | Brune et al. | 335/35 |
| 5,245,498 | 9/1993 | Uchida et al. | 361/47 |
| 5,250,918 | 10/1993 | Edds et al. | 335/35 |

(List continued on next page.)

FOREIGN PATENT DOCUMENTS

| | | |
|---|---|---|
| 2036032 | 8/1991 | (CA) . |
| WO 91/13454 | 9/1991 | (WO) . |
| WO 95/20235 | 7/1995 | (WO) . |

*Primary Examiner*—Stephen W. Jackson
(74) *Attorney, Agent, or Firm*—Cantor Colburn LLP; Carl B. Horton

(57) ABSTRACT

A residential load center includes an electronic trip unit as the main circuit breaker for overcurrent and arcing fault protection while connecting with thermal magnetic circuit breakers in each of the branch circuits for overcurrent protection within the individual branch circuits.

19 Claims, 6 Drawing Sheets

U.S. PATENT DOCUMENTS

| | | | |
|---|---|---|---|
| 5,299,730 | 4/1994 | Pasch et al. | 228/180.22 |
| 5,303,113 | 4/1994 | Goleman et al. | 361/93 |
| 5,307,230 | 4/1994 | MacKenzie | 361/96 |
| 5,359,293 | 10/1994 | Boksiner et al. | 324/544 |
| 5,418,463 | 5/1995 | Fleming et al. | 324/520 |
| 5,420,740 | 5/1995 | MacKenzie et al. | 361/45 |
| 5,432,455 | 7/1995 | Blades | 324/536 |
| 5,434,509 | 7/1995 | Blades | 324/536 |
| 5,452,223 | 9/1995 | Zuercher et al. | 364/483 |
| 5,453,723 | 9/1995 | Fello et al. | 335/18 |
| 5,459,630 | 10/1995 | MacKenzie et al. | 361/45 |
| 5,475,609 | 12/1995 | Apothaker | 364/492 |
| 5,483,211 | 1/1996 | Carrodus et al. | 335/18 |
| 5,485,093 | 1/1996 | Russell et al. | 324/522 |
| 5,493,278 | 2/1996 | MacKenzie et al. | 340/638 |
| 5,506,789 | 4/1996 | Russell et al. | 364/492 |
| 5,510,946 | 4/1996 | Franklin | 361/56 |
| 5,510,949 | 4/1996 | Innes | 361/93 |
| 5,512,832 | 4/1996 | Russell et al. | 324/522 |
| 5,519,561 | 5/1996 | Mrenna et al. | 361/105 |
| 5,546,266 | 8/1996 | MacKenzie et al. | 361/93 |
| 5,550,751 | 8/1996 | Russell | 364/492 |
| 5,561,605 | 10/1996 | Zuercher et al. | 364/483 |
| 5,578,931 | 11/1996 | Russell et al. | 324/536 |
| 5,583,732 | 12/1996 | Seymour et al. | 361/93 |
| 5,590,012 | 12/1996 | Dollar, II | 361/113 |
| 5,600,526 | 2/1997 | Russell et al. | 361/65 |
| 5,614,878 | 3/1997 | Patrick et al. | 335/14 |
| 5,615,075 | 3/1997 | Kim | 361/87 |
| 5,629,824 | 5/1997 | Rankin et al. | 361/57 |
| 5,659,453 | 8/1997 | Russell et al. | 361/93 |
| 5,694,101 | 12/1997 | Lavelle et al. | 335/172 |
| 5,706,154 | 1/1998 | Seymour | 361/42 |
| 5,818,671 | 10/1998 | Seymour et al. | 361/42 |
| 5,825,598 * | 10/1998 | Dickens et al. | 361/42 |
| 5,831,500 | 11/1998 | Turner et al. | 335/17 |

* cited by examiner

RESIDENTIAL LOAD CENTER WITH ARCING FAULT PROTECTION

BACKGROUND OF THE INVENTION

Thermal magnetic circuit breakers having added means for providing arcing fault protection in residential load centers are currently available. Because of the low current conditions associated with arcing faults, most manufacturers recommend installing circuit breakers with arcing fault detection in each of the branch circuits associated within the residential to load centers. The use of such thermal magnetic circuit breakers equipped with arcing fault protection is further suggested to limit any so-called "nuisance tripping", which may occur upon implementation of power tools and the like, to the specific branch circuit in which the power tools are connected.

The use of circuit breakers having electronic trip units such as described in U.S. Pat. No. 4,672,501 entitled "Circuit Breaker and Protective Relay Unit" within residential load centers and lighting panelboards as described in U.S. Pat. No. 3,463,967 entitled "Panelboard Load Center", has heretofore been discouraged because of the required use of current transformers to sense the circuit current and provide the trip units with signals representative of circuit current. The large size and significant cost requirements of the current transformers results in a corresponding added cost and increased size in the circuit breakers which contain the transformers.

Thermal magnetic residential type circuit breakers, such as described in the U.S. Pat. No. 5,519,561 entitled "Circuit Breaker Using Bimetal of Thermal-magnetic Trip to Sense Current", are currently available for sensing and detection arcing faults within the branch circuits of residential load centers.

One approach to an economically feasible implementation of arcing fault protection in a residential load center and lighting panelboard enclosure is the use a thermal magnetic circuit breaker adapted for arcing fault detection as the main circuit breaker, per se. The low probability of the occurrence of an arcing fault to interrupt all the branch circuits could offset any inconvenience that may occur upon such interruption.

A deterrent to the use of a bimetal within a thermal magnetic trip unit for sensing arcing fault current within a main circuit breaker is the size requirement of the main circuit breaker trip unit bimetal for handling all the circuit currents. It is believed that the larger current rating required with the main trip unit bimetal would limit the sensitivity of the bimetal to the low currents associated with the arcing fault occurrence.

It would be economically feasible to use a single main circuit breaker having an electronic trip unit in a residential load center to provide overall circuit protection, including arcing fault protection, in series with corresponding branch circuit breakers having thermal magnetic trip units dedicated solely to overcurrent protection within the branch circuits. The implementation of the main circuit breaker to sense arcing fault occurrence within the branch circuit breakers would require a transducer sensitive to such arcing fault occurrence without causing nuisance tripping, as described above.

The recent advent of small-sized semiconductors for sensing circuit current may result in the replacement of current transformer in circuit protection apparatus utilizing electronic trip units for overcurrent determination.

U.S. patent application No. 6,094,330 entitled "Circuit Interrupter Having Improved Current Sensing Apparatus" describes a miniature semiconductor in the form of a giant magnet resistor, GMR, used in place of current transformers for sensing arcing current as well as long time, short time and instantaneous overcurrent conditions.

U.S. patent application No. 6,002,561 entitled "Arcing Fault Detection Module" describes a simple electronic circuit that includes an autocorrelation transceiver adapted for determining the presence of an arcing fault condition and for interrupting a protected circuit upon such an occurrence.

One purpose of this invention, accordingly, is to describe a residential circuit breaker load center utilizing thermal magnetic residential circuit breakers within each branch circuit for overcurrent protection while employing a main circuit breaker for providing both overcurrent and arcing fault protection to the branch circuits.

SUMMARY OF THE INVENTION

A residential load center includes a main breaker utilizing an electronic trip unit for overcurrent and arcing fault protection connecting with thermal magnetic circuit breakers in each of the branch circuits for overcurrent protection within the individual branch circuits. GMR semiconductor sensors as well as Hall effect devices are employed within the main circuit breaker for arc fault current sensing and an arc fault detection module is used with the electronic trip unit for arcing fault determination.

DESCRIPTION OF THE PREFERRED EMBODIMENT

Figure 1:
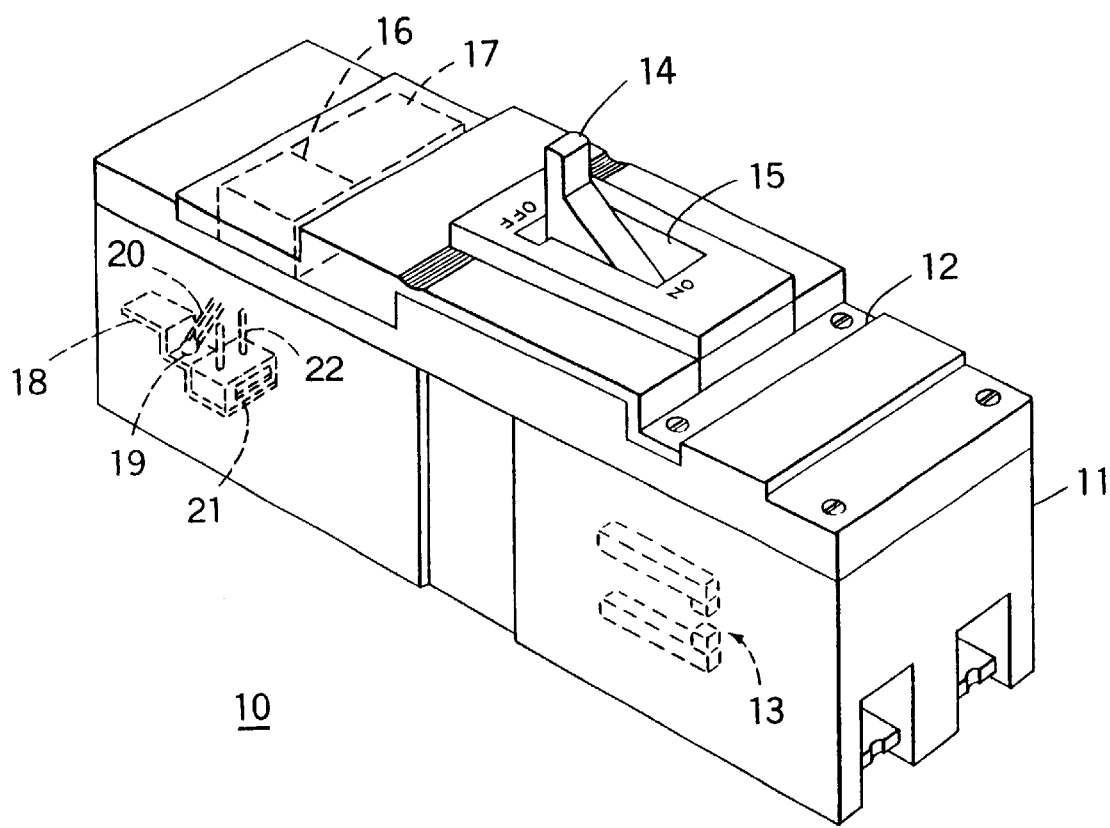
FIG. 1 is a top perspective view of a main residential circuit breaker employing both overcurrent and arcing fault protection according to the invention.
Figure 2:
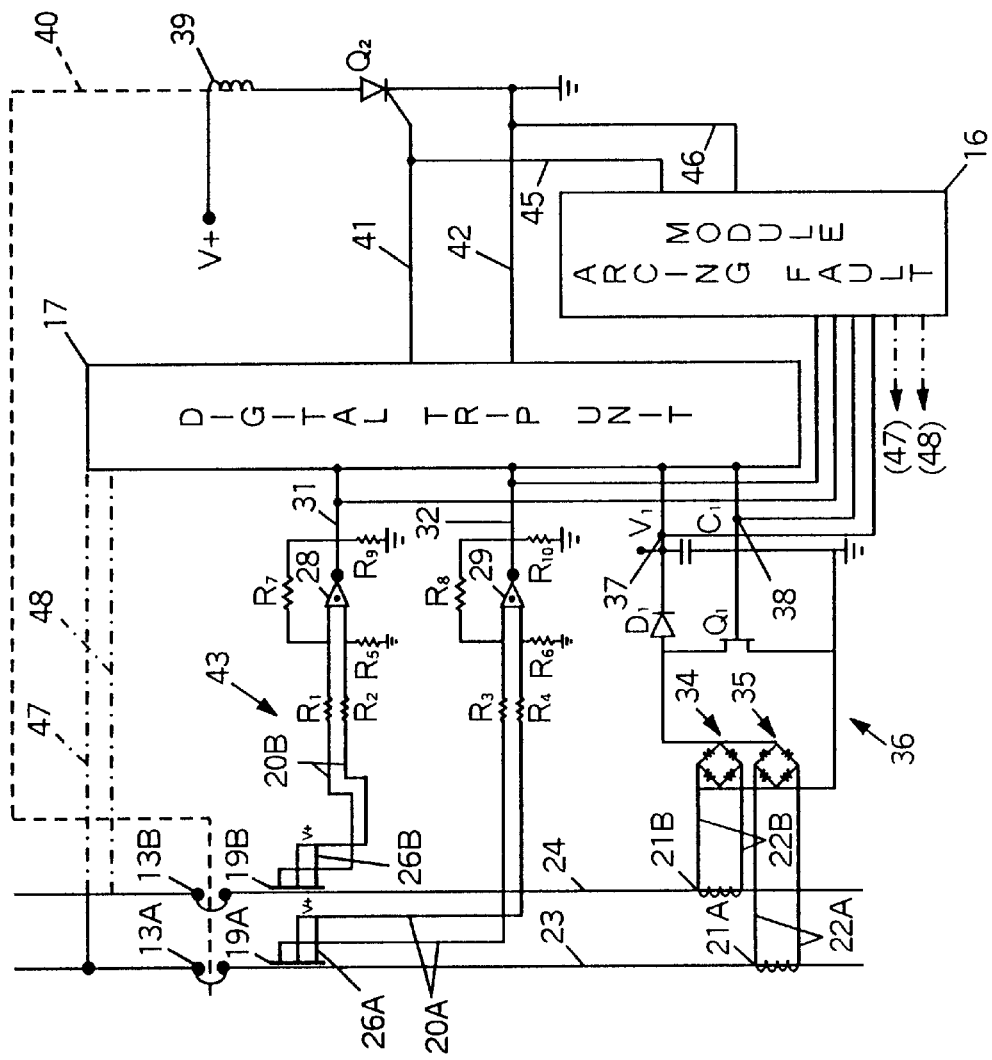
FIG. 2 is a schematic representation of the electronic trip unit and arcing fault detection module contained within the circuit breaker of FIG. 1.

An electronic circuit breaker 10, similar to that described in U.S. patent application No. 6,094,330, is shown in FIG. 1 to consist of a molded plastic case 11 to which a cover 12 of similar material is attached. A pair of separable contacts 13 are turned to ON and OFF positions by means of an external operating handle 14 that extends through an aperture 15 in the circuit breaker cover. A digital trip unit 17 containing a microprocessor within an electronic logic circuit as described in the aforementioned U.S. Pat. No. 4,672,501 can be employed to determine the occurrence of an overcurrent condition within the protected. The operation of an ASIC electronic logic circuit within the trip unit 17 to interrupt circuit current upon occasion of an overcurrent condition within the protected circuit is described in U.S. Pat. No. 4,589,052 entitled "Digital I2T Pickup, Time Bands and Timing Control Circuits for Static Trip Circuit Breakers" In accordance with the invention, a semiconductor 19 is positioned on the load straps 18 for sensing the current transfer through the line straps and transferring signals representations thereof to the trip unit 17 over a pair of conductors 20. The semiconductor 19 can comprise a GMR device, such as type NVE AAxxx obtained from Nonvolatile Electronics Inc. similar to that described in U.S. patent application No. 5,933,306 entitled "Circuit Breaker with Ground Fault Detection Module", or a Hall effect device, such as type GH 600 obtained from F. W. Bell Co., Orlando, Fla. similar to that described in U.S. patent application No. 09/006,795 entitled "Circuit Breaker Having Hall Effect Sensors". An iron core miniature current transformer 21 is connected with the line conductors 18 within the transformer case 11 to provide operating power to the trip unit 17 over a pair separate conductors 22. Also included within the circuit breaker 10 is an arcing fault detection circuit 16 similar to that described within the aforementioned U.S. patent application No. 6,002,561 entitled "Arcing Fault Detection Module" for purposes of determining the presence of an arcing fault and separating contacts 13 upon such occurrence. The sophisticated circuits employed therein deter the occurrence of nuisance tripping and allows the use of the circuit breaker as a main breaker within a residential load center as well as in lighting panel board applications. The electrical connections between the power conductors 23, 24 in a residential load center, such as that described in aforementioned U.S. Pat. No. 3,463,967 and the circuit breaker trip unit 17 are now shown in FIG. 2. The circuit breaker contacts 13A, 13B, are connected in series within the residential distribution system represented by conductors 23,24. The semiconductors 19A, 19B, are positioned next to the conductors and the current transformers 21A, 21B, are connected such that the conductors provide the primary windings to the respective current transformers. In some circuits, only one current transformer is sufficient for providing the trip unit with operating power. The output of the current transformers connect through conductors 22A, 22B, with the power input ports of the trip unit 17 via conductors 37, 38 through a shunt regulator circuit 36 consisting of the bridge rectifiers 34,35, diode rectifier D1, FET switch Q1, and filter capacitor C1 to provide operational power to the trip unit. The output of the semiconductors 19A, 19B, connect through conductors 20A, 20B, with the logic input ports of the trip unit 17 via conductors 31, 32 through the conditioner circuit 43 consisting of current limiting resistors R1–R4, reference resistors R5,R6, inverted operational amplifiers 28, 29, feedback resistors R7, R8 and burden resistors R9, R10 respectively. Operating power to each of the semiconductors 19A, 19C, is provided by means of conductors 26A, 26B respectively. In place of the current transformers 21A, 21B, direct power connection between the trip unit 17 and the power conductors 23, 24 can be made via conductors 47, 48 as indicated in phantom, if desired. In place of the current transformers that provide electrical isolation between the trip unit and the power conductors in accordance with the relevant Electric Codes, other means of isolation circuitry within the trip unit may be employed. The output ports of the trip unit 17 connect with ground over conductor 42 and with the gate of the switching transistor Q2, which comprises a thyristor or SCR, over conductor 41 to energize the trip solenoid unit 39 and separate the circuit breaker contacts 13A, 13B over the control line 40 upon occurrence of an overcurrent condition within the protected circuit in the manner described within the aforementioned U.S. Pat. No. 4,589,052. With overcurrent protection provided by means of the trip unit 17, the detection module 16 which connects with the conditioner circuit 43 by means of the same conductors 31, 32 and with the shunt regulator circuit 36 by means of the same conductors 37, 38 provides arcing fault protection. Upon determination of the occurrence of tile arcing fault, in the manner described within the aforementioned U.S. patent application No. 6,002,561 the detection module outputs a control signal to the gate of the switching transistor Q2 to energize the solenoid 39 over conductor 45 for separating the contacts 13A, 13B, and connects with ground over a separate ground conductor 46, as indicated. Connection is made with the conductors 47, 48 in the manner described earlier when the current transformers 21A, 21B are not employed.

Figure 2A:
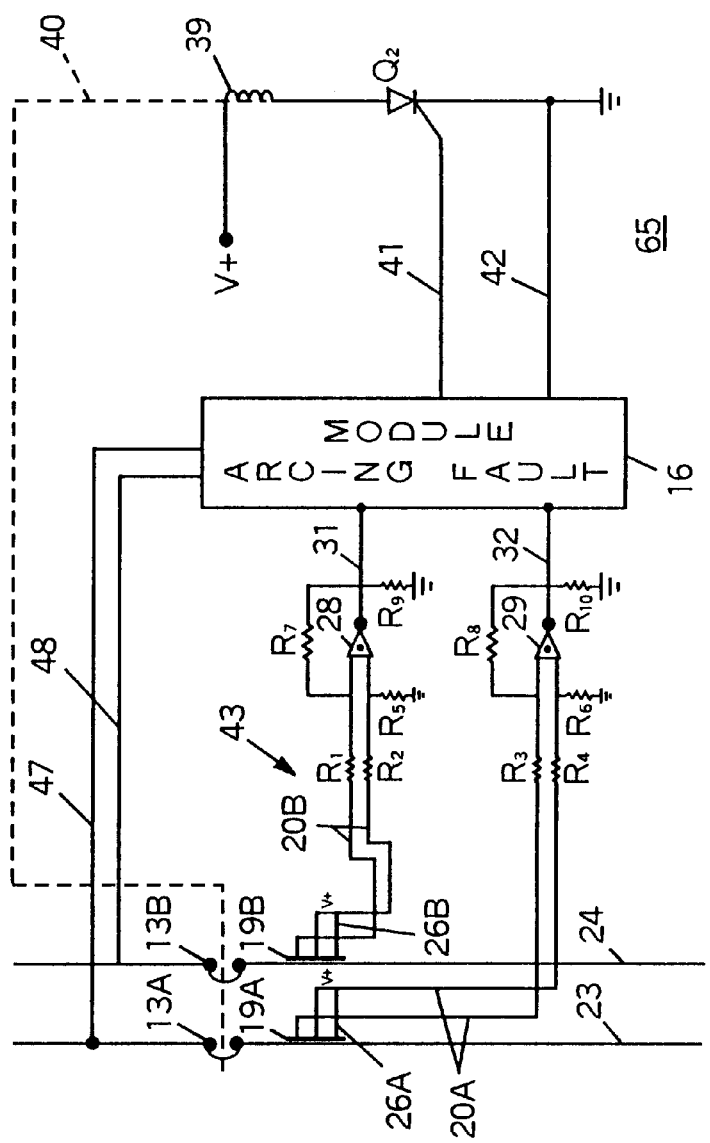
FIG. 2A is a schematic representation of an arcing fault detection circuit unit used within a modular arcing fault protection unit.

A simplified arcing fault module 65 is depicted in FIG. 2A for use as an add-on to a main circuit breaker containing a thermal magnetic trip unit for overcurrent protection. The circuit breaker contacts 13A,13B, are connected in series within the residential distribution system represented by conductors 23,24 and the semiconductors 19A, 19B, are positioned next to the conductors as described earlier. Direct power connection between the detection module 16 and the power conductors 23, 24 is made via conductors 47, 48 to provide operating power to the detection module and to operate the trip solenoid 39. The output ports of the detection module connect with ground over conductor 42 and with the gate of the switching transistor Q2 over conductor 41 to energize the trip solenoid 39 and separate the circuit breaker contacts 13A, 13B over the control line 40 upon occurrence of an overcurrent condition within the protected as described earlier. The detection module 16 which connects with the conditioner circuit 43 by means of the same conductors 31, 32 and with the shunt regulator circuit 36 by means of the same conductors 37, 38 provides the arcing fault protection. Upon determination of the occurrence of the arcing fault, the detection module outputs a control signal to the gate of the switching transistor Q2 to energize the trip solenoid 39 over the control line 40 for separating the contacts 13A, 13B.

Figure 3:
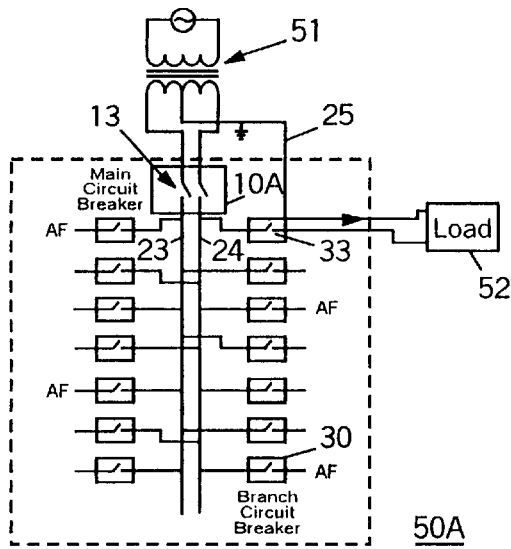
FIG. 3 is a diagrammatic representation of a load center providing arcing fault protection according to the Prior Art.

A residential load center 50A, according to the prior art, is shown in FIG. 3, and connects through a main circuit breaker 10 with the utility distribution transformer 51 by means of the main conductors 23, 24 and main contacts 13, as indicated. A separate neutral conductor 25 connects with each of the distributed loads 52 through separate branch circuit breakers 36 having separate branch contacts 33. Certain selected branch circuit breakers 33, designated A–F include arcing fault sensing means to provide arcing fault protection to the associated branch circuits. Since the current rating for the main circuit breaker 10A is set higher than the current rating of the branch circuit breakers, the suggestion of providing arcing fault protection within the main circuit breaker has not heretofore proved feasible.

Figure 4:
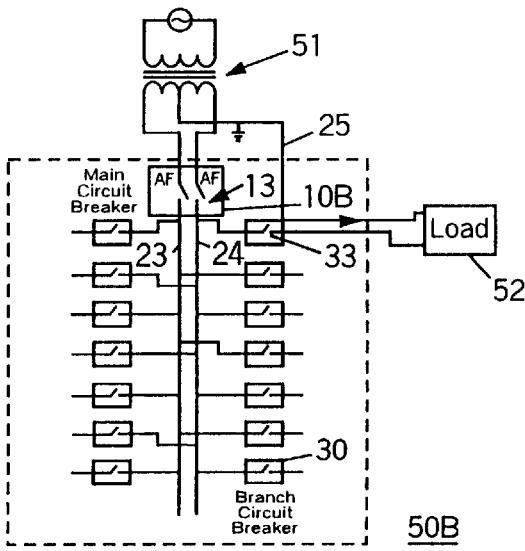
FIG. 4 is a diagrammatic representation of a load center providing arcing fault protection according to one embodiment of the invention.

In accordance with the invention, a load center 50B as shown in FIG. 4, is similar to that shown earlier in that the main circuit breaker 10B connects with the distribution transformer 51 by means of the main conductors 23, 24 and main contacts 13 with the branch circuit breakers 36 connecting with the distributed loads through the separate branch contacts 33. The load center 50B includes means for arcing fault detection as indicated at A–F and the branch circuit breakers are absent arcing fault detection. Upon occurrence of an arcing fault within any of the branch circuits, the main circuit breaker 10B responds to separate the main contacts 13 to interrupt the current throughout all the branch circuits. Since the occurrence of an arcing fault is usually extremely rare, the interruption of all the branch circuits is a minimum inconvenience compared to the extreme benefits of the arcing fault protection.

Figure 5:
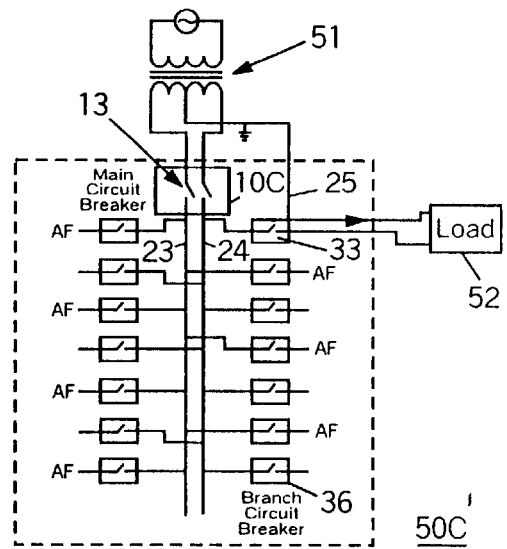
FIG. 5 is a diagrammatic representation of a load center providing arcing fault protection according to a further embodiment of the invention.

A further arrangement of the arcing fault detection in the main circuit breaker is shown in FIG. 5 similar to that shown earlier in that the main circuit breaker 10C connects with the distribution transformer 51 by means of the main conductors 23, 24 and main contacts 13 with the branch circuit breakers 36 connecting with the distributed loads through the separate branch contacts 33. The load center 50C contains a main circuit breaker 10C equipped with ground fault detection as indicated at A–F while the branch circuit breakers 36 are also equipped with arcing fault detection as indicated at A–F. The placement of arcing fault protection both in the main circuit breaker as well as in the branch circuit breakers is suggested within homes for the elderly as well as within hospitals, medical clinics and the like where further protection is desired.

Figure 6:
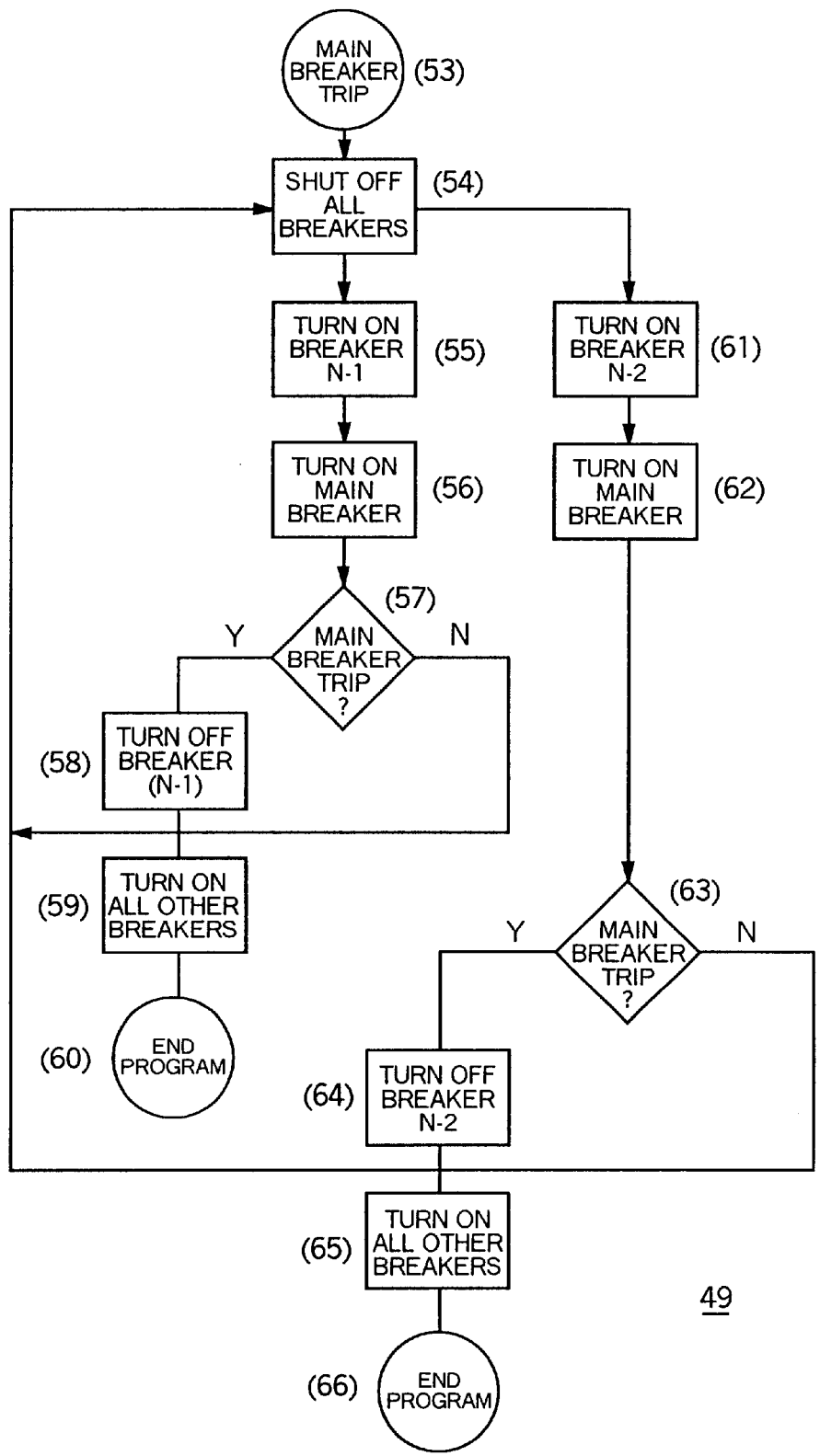
FIG. 6 is a flow chart diagram of an operating program used within the circuit of FIG. 2.

A simple algorithm is suggested as a means to determine which of the branches is experiencing the arcing fault upon response of the main circuit breaker to interrupt the circuit current in all branches. The algorithm can be performed manually or automatically by means of a mechanical interconnection between the main circuit breaker and the branch circuit breakers as described in U.S. Pat. No. 5,373,411 entitled "Remote Control Circuit Breaker System". The operation of the algorithm flow chart (49) is best seen by now referring to FIG. 6 wherein the main circuit breaker trips (58) and a command is outputted to turn off all circuit breakers (54) and turn on a first branch circuit breaker (55). The main circuit breaker is turned on (57) and a determination is made as to whether the main circuit breaker has tripped (57) and if so, the first branch circuit breaker is again turned off(58), all other circuit breakers are turned on (59) and the program is ended (60). If the main circuit breaker doesn't trip, the main circuit breaker is again turned off(54), the second branch circuit breaker is turned on (61), and the main circuit breaker is again turned on (62). A determination is made as to whether the main circuit breaker has tripped (63) and if so, the second branch circuit breaker is again turned off (64), all other circuit breakers are turned on (65) and the program is ended (66). If the main circuit breaker doesn't trip, the main circuit breaker is again turned off (54), and the remaining branch circuit breakers are sequentially tested until the branch circuit experiencing the arcing fault is determined.

Figure 7:
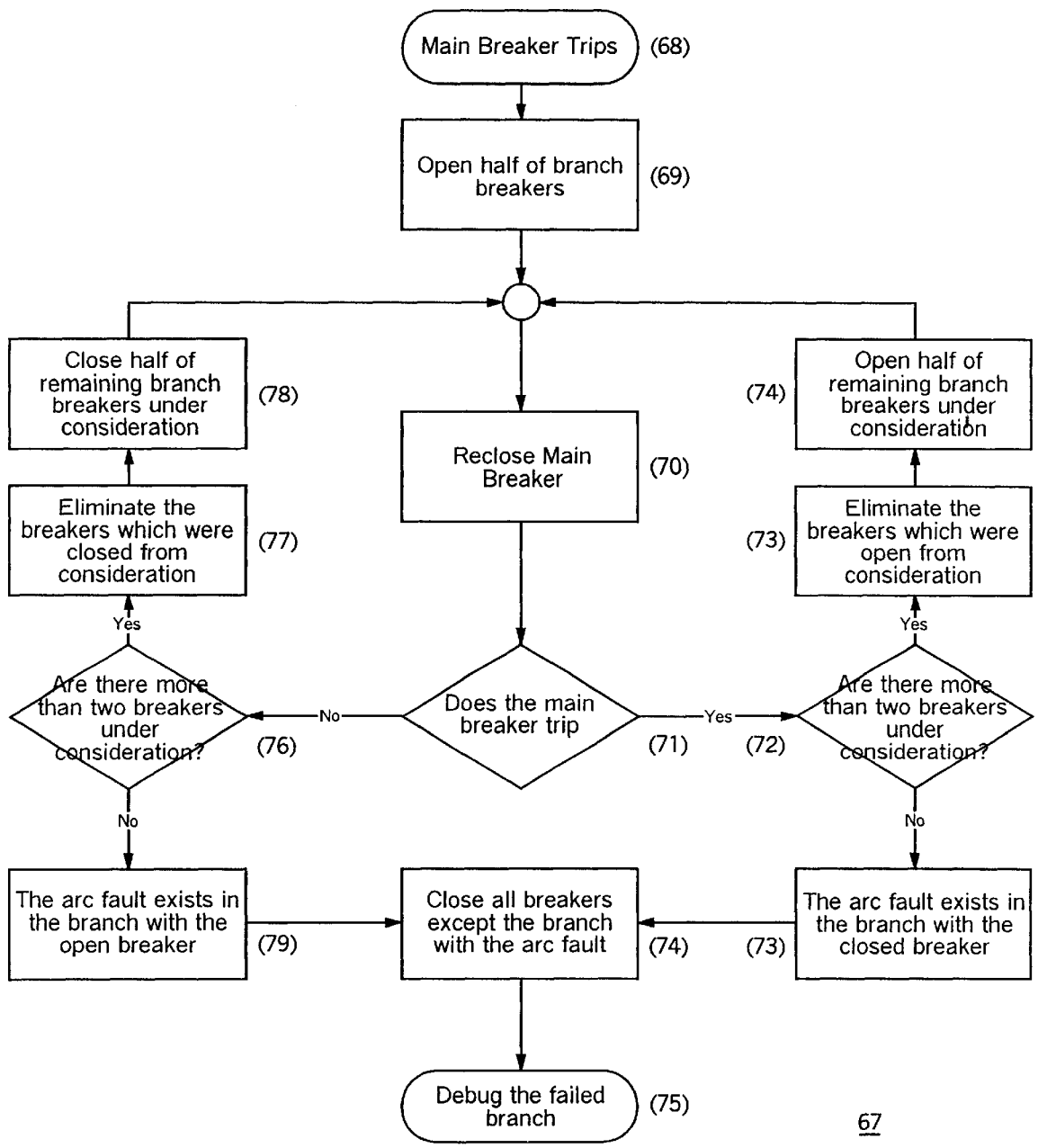
FIG. 7 is an alternate flow chart diagram of an operating program used within the circuit of FIG. 2.

Another approach to determine which of the branches is experiencing the arcing fault is found in the search algorithm 67 depicted in FIG. 7 wherein after the main circuit breaker trips (68) open the main breaker and half of the branch breakers (69) and reclose the main breaker (70). Determine whether the main breaker trips (71) and if so, the arc fault is considered to exist within one of the branches containing the branch circuit breakers that are closed and a determination is made as to whether there are more than two branch breakers under consideration (72). If not, the arc fault is determined to be in the branch with the closed branch breaker (73) and all the branch breakers are closed except the branch breaker with the arc fault (74) and the failed branch circuit is investigated (75). If there are more than two branch breakers under consideration (72), the branch breakers that were open are eliminated from consideration 73), half of the remaining branch breakers are opened (74) and steps (70), (71) are repeated. If the main circuit breaker does not trip, the arc fault is considered to exist within one of the branches containing the branch circuit breakers that are opened and a determination is made as to whether there are more than two branch breakers under consideration (67). If not the arc fault is determined to exist in the branch with the open branch breaker (79), all the branch breakers are closed except the branch breaker with the arc fault (74) and the failed branch circuit is investigated (75). If there are more than two branch breakers under consideration, the branch breakers which are closed are eliminated from consideration (77), the remaining half of the branch breakers are closed (78) and steps (70), (71) are repeated until the arc fault is determined.

What is claimed is:

1. A load center having arcing fault protection comprising:
    a main circuit breaker adapted for connecting between an external voltage source and a protected circuit having a plurality of branches, said main circuit breaker containing a pair of separable main contacts, said main circuit breaker including main overcurrent means for interrupting current flow through said main circuit breaker upon occurrence of an overcurrent condition within said protected circuit, said main circuit breaker including a single main arcing fault detection device for interrupting current flow through said main circuit breaker upon occurrence of an arcing fault condition within any branch in said protected circuit; and
    a plurality of branch circuit breakers, each one of said branch circuit breakers connecting internally with said main circuit breaker contacts and connecting externally with said protected circuit through a plurality of electrical conductors, each one of said branch circuit breakers containing a pair of separable branch contacts and branch means for determining occurrence of all overcurrent condition within said protected circuit and for interrupting current flow through each one of said branch circuit breakers upon occurrence of all overcurrent condition within said protected circuit.

2. The load center of claim 1 wherein said main circuit breaker includes means for sampling said current flow through each one of said branch circuit breakers for determining an overcurrent condition.

3. The load center of claim 2 wherein said means for sampling current flow through each one of said branch circuit breakers comprises a GMR semiconductor.

4. The load center of claim 2 wherein said means for sampling current flow through each one of said branch circuit breakers comprises a Hall effect semiconductor.

5. The load center of claim 2 wherein said main overcurrent means for determining an overcurrent condition comprises an electronic logic circuit.

6. The load center of claim 3 wherein said main arcing fault detection device for determining an arcing fault condition comprises a main detection module circuit.

7. The load center of claim 1 including branch overcurrent means for determining occurrence of an overcurrent condition within said protected circuit.

8. The load center of claim 6 wherein said branch overcurrent means for determining occurrence of an overcurrent condition comprises a thermal magnetic trip unit.

9. The load center of claim 1 including branch arcing fault means for determining occurrence of an arcing fault condition within a selected branch.

10. The load center of claim 9 wherein branch arcing fault means for determining an arcing fault condition comprises a branch detection module circuit.

11. The load center of claim 5 including means for providing electric power to said electronic logic circuit.

12. The load center of claim 11 wherein said means for providing electric power comprises a current transformer.

13. The load center of claim 11 wherein said means for providing electric power comprises an electric connection between said external electric circuit.

14. A method for providing arcing fault protection to an electric circuit comprising the steps of connecting a main circuit breaker between an external voltage source and a protected circuit, said main circuit breaker containing a pair of separable main contacts, said main circuit breaker including main overcurrent means for interrupting current flow through said main circuit breaker upon occurrence of an overcurrent condition within said protected circuit, providing said main circuit breaker with a single main arcing fault detection device, arranging the single main arcing fault detection device for detecting an arcing fault condition and for interrupting current flow through said main circuit breaker upon occurrence of an arcing fault condition anywhere within said protected circuit; and connecting a plurality of branch circuit breakers with said main circuit breaker each one of said branch circuit breakers connecting internally with said main circuit breaker contacts and connecting externally with said protected circuit through a plurality of electrical conductors, each one of said branch circuit breakers containing a pair of separable branch contacts and branch means for determining occurrence of an overcurrent condition within said protected circuit and for interrupting current flow through each one of said branch circuit breakers upon occurrence of an overcurrent condition within said protected circuit.

15. The method of claim 14 including the step of sampling current flow through each one of said branch circuit breakers for determining an overcurrent condition within said protected circuit.

16. The method of claim 14 including the step of sampling current flow through each one of said branch circuit breakers for determining an arcing fault condition within said protected circuit.

17. The method of claim 14 including the steps of:

determining when said main circuit breaker trips;

turning off said branch circuit breakers;

turning on a first branch circuit breaker;

turning on said main circuit breaker;

determining whether said main circuit breaker has tripped;

turning off said first branch circuit breaker when said main circuit breaker trips and;

turning off said main circuit breaker when said main circuit breaker does not trip.

18. The load center of claim 1 further comprising means for determining which branch within the protected circuit is experiencing an arcing fault upon response of the main circuit breaker interrupting current in all the branches upon occurrence of an arcing fault condition within a branch.

19. The load center of claim 18 wherein the means for determining which branch is experiencing an arcing fault is an algorithm residing in the load center.

* * * * *

UNITED STATES PATENT AND TRADEMARK OFFICE
CERTIFICATE OF CORRECTION

PATENT NO. : 6,268,989 B1
DATED : July 31, 2001
INVENTOR(S) : Dougherty et al.

It is certified that error appears in the above-identified patent and that said Letters Patent is hereby corrected as shown below:

Column 1,
Line 66, after "patent" delete "application"

Column 2,
Lines 5 and 57, after "patent" delete "application"

Column 3,
Line 12, before "No." delete "application"
Line 23, after "patent" delete "application"

Column 4,
Line 9, before "arching fault" delete "title" and insert therefor -- the --
Line 10, after "patent" delete "application"
Line 33, after "protected" insert therefor -- circuit --

Signed and Sealed this

Twenty-second Day of March, 2005

JON W. DUDAS
*Director of the United States Patent and Trademark Office*